United States Patent

[11] 3,602,555

[72] Inventor Harvey Hendler
 Wayne, N.J.
[21] Appl. No. 859,079
[22] Filed Sept. 18, 1969
[45] Patented Aug. 31, 1971
[73] Assignee Singer-General Precision, Inc.
 Little Falls, N.J.

[54] JOURNAL BEARING
 2 Claims, 5 Drawing Figs.

[52] U.S. Cl. .................................................. 308/9
[51] Int. Cl. ............................................. F16c 17/02
[50] Field of Search .......................... 308/9, 121, 122, 240

[56] References Cited
UNITED STATES PATENTS
2,479,349 8/1949 Hagg ........................... 308/240
3,439,962 4/1969 Gothberg ..................... 308/9
FOREIGN PATENTS
585,864 2/1947 Great Britain .............. 308/240
OTHER REFERENCES
Product Engineering, page 386, Jul. 1942 copy in class 308/240

Primary Examiner—Martin P. Schwadron
Assistant Examiner—Frank Susko
Attorneys—S. A. Giarratana and S. M. Bender ABSTRACT: A journal bearing for a rotating mass, wherein a lubricating fluid is disposed in a bearing cavity defined between an inner bearing member and an outer bearing member. One of the bearing surfaces is provided with at least two sets of grooves, the grooves of each set adapted to impel said fluid axially with respect to said cavity towards a common point.

HARVEY HENDLER
INVENTOR.

BY

HARVEY HENDLER
INVENTOR.

JOURNAL BEARING

BACKGROUND OF THE INVENTION

This invention relates to a journal bearing and, more particularly, to such a bearing having at least two sets of grooves formed in one of the cooperating surfaces of an outer bearing member and an inner bearing member separated by a fluid lubricant.

Grooved journal bearings are generally known, and normally feature the use of a single set of grooves formed in the outer surface of a journal which extends within a liquid reservoir extending between it and its stator. Therefore, when the journal is rotated with respect to the stator, the stability of the bearing is increased with no sacrifice in load capacity since the outer grooves are arranged so that they act like a pump as the journal turns, forcing fluids from the ends of the grooved bearing towards the middle thereof.

However, these arrangements suffer since the radial stiffness in the grooved bearing is not constant throughout the length of the bearing, but rather increases towards the center thereof. Therefore, for a given applied external force, such as that caused by the drive motor for the journal, for example, the journal will deflect about a node point and cause an external reaction along various portions of the journal. This is extremely undesirable in certain applications, such as in the use of gyroscopes having a sensitive point at its hinge center, since these reactions will result in drift.

SUMMARY OF THE INVENTION

It is therefore an object of the present invention to provide a grooved journal bearing in which the reaction force acting on the bearing is more evenly distributed over the length of the journal, thereby eliminating any unnecessary external forces acting along the journal.

This object is achieved according to the bearing of the present invention which comprises an inner bearing member, an outer bearing member extending coaxially with said inner bearing member, the inner surface of said outer bearing member being spaced from the outer surface of said inner bearing member to define a cylindrical bearing cavity, a lubricating fluid disposed in said cavity, at least one of said surfaces being provided with at least two sets of grooves, the grooves of each set adapted to impel said fluid axially with respect to said cavity towards a common point to form at least two points of maximum stiffness along said journal. BRIEF DESCRIPTION OF THE DRAWINGS Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

Figure 1:
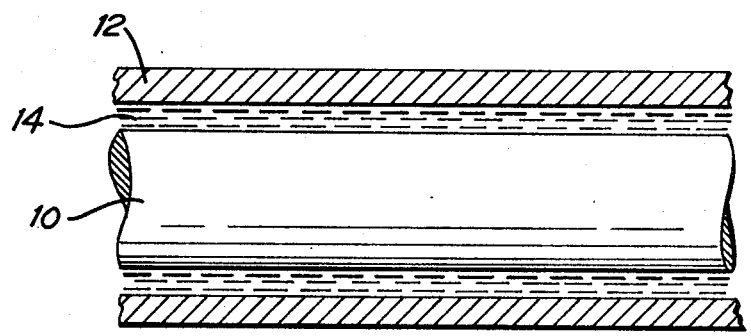
FIG. 1 is a fragmentary elevational view of a typical prior art arrangement of a rotor stator.
Figure 2:
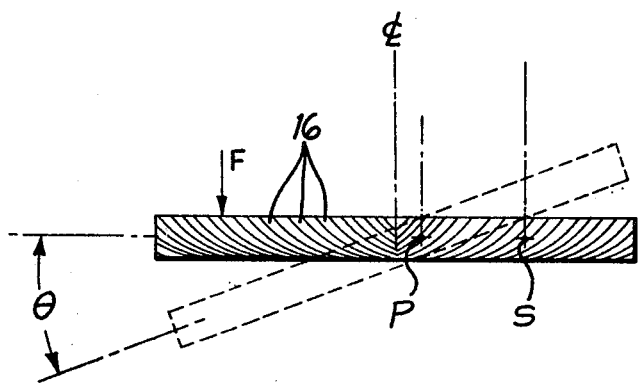
FIG. 2 is an elevational view of a grooved journal according to a prior art arrangement.
Figure 4:
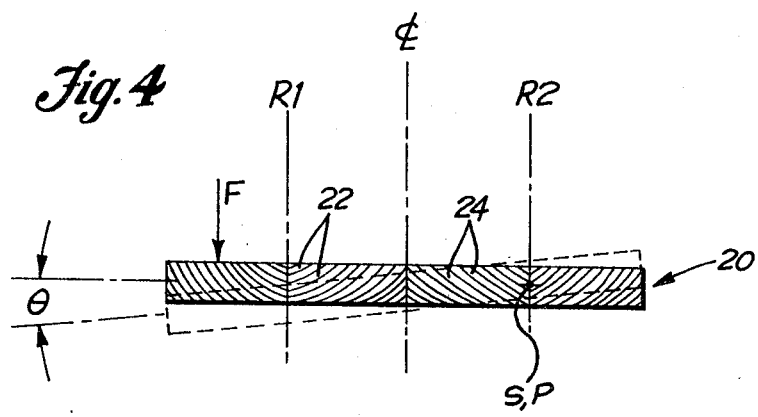
Figure 5:
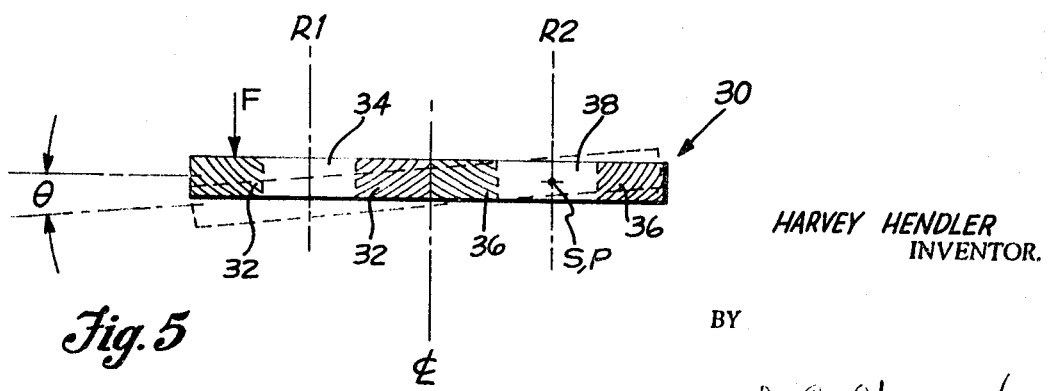

FIG. 4 is a view similar to FIG. 2 but showing the grooved journal of the present invention; and FIG. 5 is a view similar to FIG. 4 but showing another embodiment of the grooved journal of the present invention.
DESCRIPTION OF THE PREFERRED EMBODIMENTS FIG. 1 of the drawings depicts a typical environment for a journal bearing, and includes a journal 10 disposed in a fixed stator 12, with a fluid such as gas or the like disposed in the bearing cavity defined between the outer surface of the journal and the inner surface of the stator.

According to some known arrangements, the journal 10 is grooved in a manner shown better with reference to FIG. 2. Specifically, a single set of grooves 16 are formed in the journal 10 and are arranged so that the fluid in the bearing cavity will be impelled inwardly towards the centerline C/L upon rotation of the journal. The radial stiffness of the bearing is thus at a maximum at the centerline and, although this adds stability to the bearing, a major disadvantage exists in the design. Specifically, upon an external force being applied to the journal 10 by its driving motor, or the like, in a direction indicated by the arrow F, for example, the journal will pivot about a node, or pivot point P, and assume an initial hangoff angle $\theta$. Thus in the event there is a sensitive point associated with the rotating journal or stator such as in the case of the hinge center of a gyroscope, which sensitive point lies at a point shown, for example, by the letter S in FIG. 2, a lever arm will be created corresponding to the distance between point P and point S. The above pivoting thus creates a displacement of the sensitive point S, which if in the form of a hinge center of a gyroscope, will manifest itself as a gyro drift of an appreciable nature.

Figure 3:
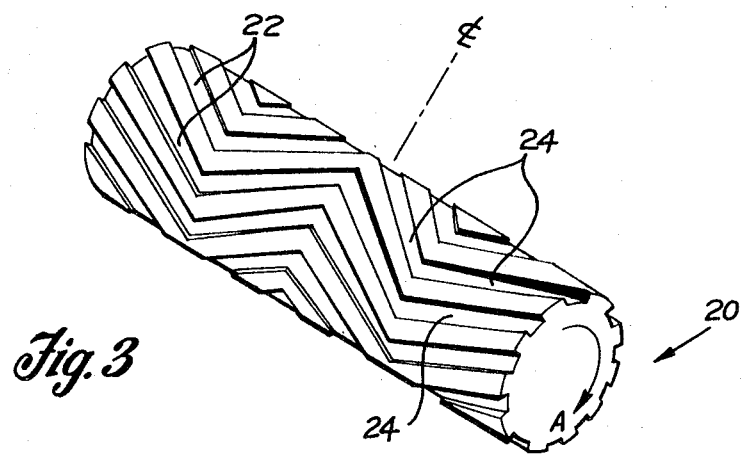
FIG. 3 is a perspective view depicting a grooved journal according to the present invention.

The above is overcome according to the journal of the present invention shown by the reference numeral 20 in FIGS. 3 and 4, in which a first set of grooves 22 are formed to one side of the centerline C/L of the journal and a second set of grooves 24 are formed to the other side of the centerline. The grooves of each set form a herringbone pattern and upon rotation of the journal in a direction indicated by the letter A in FIG. 3, the fluid is impelled towards the center of each set of grooves. Thus the radial stiffness of the bearing reaches a maximum at these two centerlines, and, as a result, the reaction to the applied load is redistributed to these two centerlines to create two primary reaction points $R_1$ and $R_2$. The design is such that the resultant location of pivot point P is now shifted to the right approaching the sensitive point S, which also corresponds to the location of the reaction point $R_2$ for the set of grooves 24. This significantly reduces the magnitude of the hangoff angle $\theta$ because the reaction force reacting from the bearing has more evenly distributed over the length of the shaft. As a result, the displacement of the sensitive point S is considerably reduced, minimizing the magnitude of the external force acting thereon.

It is understood that the location of the pivot point P with respect to the sensitive point S is a matter of design depending on the particular structure involved, and can easily be calculated utilizing basic engineering principles.

The specific pattern formed by each set of grooves may vary as long as they impel the fluid towards the centerline of each set upon rotation of the journal. For example, they may take the form of a partial herringbone pattern as shown in the embodiment of FIG. 5. In this embodiment a journal 30 is provided having a first set of grooves 32 separated by a space 34, and a second set of grooves 36 separated by a space 38. Upon rotation of the journal the grooves impel the fluid towards the centerlines of the spaces 34 and 38 to form the reaction points $R_1$ and $R_2$ and achieve the same effect as in the embodiment of FIGS. 3 and 4.

As a further example of possible variations in the present invention, more than two sets of grooves may exist in which case a reaction point would be established for each set of grooves. Also, the location of the pivot point P and the sensitive point S do not necessarily have to be along the axis of the journal, but may lie externally thereof along an extension of the axis. Of course, still other variations of the specific construction and arrangement of the journal bearing disclosed above may be made by those skilled in the art without departing from the invention as defined in the appended claims.

I claim:

1. A hydrodynamic bearing structure for providing a rotatable fixed-end cantilever support for one end of a rotating mass cantilevered therefrom, comprising an inner shaft bearing member having a longitudinal axis, said inner shaft member being arranged to provide a rotatable fixed-end cantilever support for one end of the rotating mass cantilevered therefrom, an outer journal bearing member extending coaxially with said inner bearing member, said outer journal bearing member being arranged to resist a transverse force and a bending moment transmitted through said inner shaft member from said rotating mass, the inner cylindrical surface of said outer bearing member being spaced from the outer cylindrical surface of said inner bearing member to define a cylindrical bearing cavity, and a lubricating fluid disposed in said cavity, wherein said inner shaft member surface is provided with first and second axially spaced sets of grooves, said first and second sets of grooves being arranged to provide a nonuniform distribution of fluid along the axial length of said cavity and to provide a selective distribution of fluid pressure along the axial length of said inner shaft member surface, each said set of grooves having a plurality of peripherally spaced grooves, each said groove having a pair of axially spaced symmetrically arranged groove portions, each said pair of groove portions being arranged so as to impel said fluid axially with respect to said cavity towards a common annular zone to form at least two axially spaced annular zones of maximum stiffness along said journal bearing member, and wherein each groove of said first set of grooves is disposed adjacent to and in connection with a corresponding groove of said second set of grooves.

2. The bearing structure of claim 1 wherein the grooves in each set form a partial herringbone pattern, and wherein each set of grooves has an annular space portion which is disposed in an axial direction between the pair of groove portions in said set of grooves, said annular space portion having an outer cylindrical surface.